United States Patent [19]

Dyke

[11] Patent Number: 5,349,780
[45] Date of Patent: Sep. 27, 1994

[54] RIBBED PLANT SUPPORT POLES

[75] Inventor: David E. Dyke, Rte. 1 Box 285A, Vienna, W. Va. 45784

[73] Assignees: David E. Dyke; Janet M. Dyke, Vincent, Ohio

[21] Appl. No.: 916,472

[22] Filed: Jul. 20, 1992

[51] Int. Cl.$^5$ .............................................. A01G 17/06
[52] U.S. Cl. ......................................... 47/47; 24/458; 248/188.5
[58] Field of Search ............... 47/47, 44; 24/555, 458, 24/459; 248/188.5; 403/377

[56] References Cited

U.S. PATENT DOCUMENTS

| | | |
|---|---|---|
| D. 293,874 | 1/1988 | Onoue . |
| D. 300,900 | 5/1989 | Dyke . |
| 2,024,546 | 12/1935 | Starkey ........................ 47/47 R |
| 2,057,587 | 10/1936 | Place ........................... 24/458 |
| 2,568,390 | 9/1951 | Gehrke ......................... 24/458 |
| 2,771,261 | 11/1956 | Niggeloh ..................... 248/188.5 |
| 3,061,976 | 11/1962 | Carroll et al. . |
| 3,298,073 | 1/1967 | Merfeld ....................... 24/555 |
| 4,176,494 | 12/1979 | Boucher et al. . |
| 4,354,299 | 10/1982 | Maidhof ....................... 47/44 |
| 4,519,162 | 5/1985 | Stuckey . |
| 4,523,405 | 6/1985 | Madonia . |
| 4,750,293 | 6/1988 | Dyke . |
| 4,803,802 | 2/1989 | Strumbos . |
| 4,840,345 | 6/1989 | Neil et al. .................... 24/458 |

FOREIGN PATENT DOCUMENTS

| | | |
|---|---|---|
| 0258157 | 3/1988 | European Pat. Off. ............ 47/47 |
| 3033398 | 4/1982 | Fed. Rep. of Germany ......... 47/47 |
| 2233928 | 2/1975 | France ......................... 47/47 R |
| 8002508 | 11/1980 | Netherlands .................. 47/47 R |
| 0160565 | 9/1957 | Sweden ........................ 24/459 |
| 344255 | 3/1960 | Switzerland .................... 47/47 |
| 323638 | 1/1930 | United Kingdom ............... 47/47 |
| 1404327 | 8/1975 | United Kingdom . |
| 2222927 | 3/1990 | United Kingdom . |
| WO89/07391 | 8/1989 | World Int. Prop. O. .......... 47/47 |

Primary Examiner—Ramon S. Britts
Assistant Examiner—Joanne C. Downs
Attorney, Agent, or Firm—Vickers, Daniels & Young

[57] ABSTRACT

A plant support device for supporting plant stems and fencing which includes a support member having serrated rib structures extending the longitudinal length of the support member and hole slots located adjacent to the rib structures which provide a location to attach plant clips or fencing to the support member. An extension member is provided which telescopically inserts into the support member to easily lengthen the plant support device. Various plant clips are provided which attach to the plant support device to support plant stems and fencing.

35 Claims, 6 Drawing Sheets

RIBBED PLANT SUPPORT POLES

This invention relates to the art of supporting plants and/or fencing and more particularly to a support device consisting of a support member and support clips.

BACKGROUND OF THE INVENTION

The present invention is particularly applicable to supporting any horticultural crop or plant that normally cannot support its own weight or could potentially benefit from a support structure and will be discussed with particular reference thereto; however, the invention has broader applications and may be used to support a variety of plants and may also be used to support a fencing assembly. It is well known in the field of horticulture to provide wooden or metallic stakes for supporting various fruit, flower and vegetable plants during their growth or at certain periods of growth when the stems of the plants are susceptible to damage. Typically these stakes are positioned adjacent to the base of the plant and inserted into the ground. The stem of the plant is attached to the stake by tying the stem with a string or cloth tie. This method of supporting plants requires a significant amount of time and labor to properly secure the plants to the stakes. The labor and time necessary to use this plant support system is further exasperated since the plant ties must be periodically repositioned due to the natural growth of the plant. These typical plant stakes fail to adequately support the plants without constant maintenance because of slippage of the ties on the stake. Wooden stakes when exposed to the natural elements tend to rot, split and warp. Wooden stakes typically have a life of only two to three years. Furthermore, commercial growers typically only use wooden stakes for one season since wood cannot be adequately sterilized to prevent disease carry-over. Iron or steel plant support devices are sometimes used instead of wood support devices. These stakes are much heavier and cumbersome than wooden stakes thus increasing the difficulty and time to install. These stakes also tend to bend at ground level after being inserted into the ground, thus making the stakes difficult to use in subsequent seasons. Iron and steel stakes tend to rust over extended periods of exposure to the atmosphere, thus weakening the stakes from season to season. Rusting of the stakes is accelerated when the stakes are sterilized with a chlorine solution. Hollow aluminum stakes have also been used; however, such stakes easily bend and are relatively expensive when made with a diameter sufficient to support heavy plants. Accordingly, iron, steel and aluminum stakes are characterized as costly in both material and labor.

There have been several efforts in the past to provide plant support devices to overcome these deficiencies. One such attempt can be found in my U.S. Pat. No. 4,750,293 which discloses a plastic tubular support member having a plurality of openings in the support member walls. Clips are provided with the tubular support member such that the clips fit around the pole and one end of the clip is secured to hole slots in the support member while the other side of the clip is unsecured from the pole. While adequate support is provided by this type of assembly, the pole support device tends to bend when supporting heavier plant and/or fencing. Furthermore, the support device is not adjustable in length to provide support for a variety of types of plants during their growth. Finally, the support device is not convenient to use when the weave method for supporting plants is used since the string ties tend to slip down on the support devices.

THE INVENTION

The present invention contemplates a new and improved plant support device for supporting plant stems for a variety of horticulture species which overcomes all the above referred to problems and others and provides a support member and a plurality of clips which may be manufactured rapidly and economically and significantly simplifies the securing of a plant stem to the device while providing the needed support during the growth period of the plant.

In accordance with a principal feature of the present invention, there is provided an improved plant support device for supporting a variety of plants. The plant support device consists of a non-metallic support member having a proximal end and a distal end wherein the distal end is inserted into the ground adjacent or near the base of the plant and the plant stem is supported by securing the plant stem by clips and/or ties to the support member. The plant support member can support any number of a variety of horticultural crops or plants that would or could benefit from some type of support during growth, such as tomatoes, pole beans, dwarf fruit trees, ornamental trees, cucurbits, tree poinsettias, foliage plants, cucumbers, squash, certain varieties of grapes, blueberryplantes, raspberry vines, blackberry vines, etc. The support member is also versatile enough and strong enough to be used as fencing posts to support various types of fencing such as electric, plastic or welded wire mesh, and chicken or barbed wire.

In accordance with another feature of the present invention, the plant support member is made of a plastic material. Many different plastics may be used such as polyvinyl resins, polyurethane resins, polystyrene resins, various thermoplastics, etc. The type of plastic used is only limited by its intended use. Polyvinyl resins such as polyvinyl chloride (PVC) is typically used because of its inexpensive cost and desired physical properties. PVC is a tough, strong thermoplastic material which can be easily formed in a molding or extrusion process. PVC, when properly stabilized, will not permanently deform or bend. PVC is also highly impact resistant, thus, can be driven into the ground without damage. The physical properties of the support member may be customized by forming the support member from a mixture of different polymers and/or adding additives to the polymer. The plastic support member is superior to wood, steel, iron or aluminum stakes in that the plastic member is light weight, durable, resists warping, nonrusting, non-rotting, impact resistant, easily sterilized, inexpensive and is strong enough to support heavy loads. The plastic support member may be formed by a variety of methods such as rolling sheets of plastic, molding or extruding the plastic. The extrusion process is typically utilized since plastics can be easily, rapidly and cost effectively formed from such a process. In an extrusion process, the plastic is forced or extruded through an extruding head and then through a sizing head. The formed plastic support member is cooled, typically with water, then cut to the desired length. The extruded support member can have any length, wall thickness and cross-sectional shape (round, square, polygonal, etc.). The extruded support member may have a solid, hollow or partially hollow core. Typically, the support member is extruded from a die that forms a hollow circular tube having a relatively uniform wall thickness. The extruded support member is typically cut in 4 ft, 5 ft or 6 ft lengths, however, shorter or longer lengths may be produced. The wall thickness of the support member can be varied depending on the amount of weight to be supported. Generally, the wall thickness varies between 0.05 to 0.5 inch. The PVC support member becomes stronger as the wall thickness increases and the thicker walls also resist warping of the support member by the radiation of the sun. Typically, a hollow tubular support member has a wall thickness between 0.05 to 0.1 inches. A PVC support member resists the natural elements giving the support member an approximate useful life of 15–20 years.

In accordance with still another feature of the present invention, an end member is inserted onto the distal end of the support member to improve the ease of inserting the distal end of the support member into the ground. The end member has a shaft portion and an angular portion. The shaft portion is generally inserted into the hollow end of the support member. However, the shaft portion may be designed to be inserted about the distal end of the support member. The shape of the shaft portion which is inserted into the support member normally has a similar shape as the shape of the hollow distal end of the support member. Typically, the shaft portion is cylindrically shaped and has a diameter equal to or slightly less than the inner diameter of the support member. The length of the shaft portion is about 0.5 to 2 inches. The shaft portion may have one or more compression rings encircling the shaft portion for rigidly securing the shaft to the support member. Typically, the shaft portion is one inch long and contains three compression rings equally spaced apart. Other means for securing the shaft portion to the support member may be used such as glue, nails, staples, ribbed or other shaped protrusions located on the exterior surface of the shaft, etc. The end of the shaft portion opposite the angular portion may be beveled so that the shaft end can be easily inserted into the distal end of the support member. The angular portion of the end member is generally conical in shape; however, othershapes can be used. The conical angular portion has a base diameter greater than or equal to the diameter of the shaft portion. Typically, the base diameter is larger than the shaft portion diameter to prevent the angular portion from being inserted into the support member during insertion into the ground. Typically, the diameter of the base of the angular portion is less than or equal to the outer diameter of the support member and greater than the inner diameter of the support member. The edges of the base of the angular member may be squared off such that the base is flush with the outer diameter of the support member. The end member can be formed from wood, metals, plastics or other materials. Plastic materials such as polypropylene are generally used due to its low cost and high impact properties. A molding process is typically used to form the end portion out of the plastic material. The end member can be molded such that it is hollow or solid.

In accordance with yet another feature of the present invention, a cap member is inserted into the proximal end of the support member to keep water and dirt out of the interior of the support member and to protect the proximal end from damage when the support member is inserted into the ground. The cap member has a trunk portion which inserts into or about the proximal end of the support member to secure the cap member to the support member. The trunk portion can be any shape or length. When the trunk portion is inserted into the support member, the length of the trunk portion is generally between $\frac{3}{8}$ to $1\frac{1}{2}$ inches. The shape and size of the shaft portion is typically the same or slightly smaller than the shape of the inner cross-section of the support member proximal end. A cap member for a tubular support member generally has a trunk portion length of $\frac{3}{4}$ inch and has a diameter slightly less than the inner diameter of the support member. The trunk portion may also have a securing means consisting of compression rings, rib member or other protrusions on the other surface of the trunk portion which rigidly engages the inner wall of the support member. Generally, two evenly spaced compression rings are used to prevent the cap member from easily disengaging the support member after the cap member is inserted into the support member. The trunk portion may also have a beveled end to facilitate the insertion of the cap member into the support member. The cap member can also be secured to the support member by glue, nails, tape, staples, etc. The top portion of the cap member generally has, but is not limited to, a cylindrical shape. The top portion of a cap member for a tubular support member has a diameter greater than the inner diameter of the support member and generally equal to the outer diameter of the support member. The cap member is generally made of a plastic such as polypropylene but can be made of other materials such as metal, wood, etc. The thickness of the top portion of the plastic cap member typically ranges between 1/16 to $\frac{1}{2}$ inch so as to resist cracking when force is exerted on the top portion of the cap member when the support member is inserted into the ground. The plastic cap member is generally formed from a mold and the cap member may be hollow or solid in form.

In accordance with the present invention, there is provided at least one rib structure on the exterior surface of the plant support member which longitudinally extends from the distal end to the proximal end of the plant support member. The rib structure can be formed by designing an extruding head which simultaneously forms one or more rib structures on the support member during the extrusion process. If a molding process is used to make the support member, the mold can be formed to produce a support member with one or more rib structures. The rib structures can also be manufactured independently from the support member and subsequently attached to the support member by heat treatment, gluing, etc. The rib may or may not be composed of the same material as the support member, but typically the rib structure and support member are formed by the same material especially when the extrusion process is used to simultaneously form both the rib structure and support member. The rib structure significantly increases the structural integrity of the support member and assists the support member in resisting warping and/or bending when supporting heavy plants or fencing. The support member may have any number of rib structures. As the number of rib structures increases, the strength of the support member also increases. However, if many ribbed structures are formed on the support member, the rib structures begin to crowd together and resemble a support member with a larger wall thickness. Also, the more rib structures on the support member represents additional material and cost to form the plant support device. Generally three to four rib structures on the support member provide the maximum increased structural strength and stiffness with respect to the amount of material used to form the rib structure and support members. The added strength provided by the rib structures is further optimized by equally spacing the rib structures apart on the support member. The thickness of the rib structures may vary depending on the desired strength and stiffness. Typically, the thickness of the rib structure is approximately equal to the thickness of the wall of the support member. The thickness normally varies between 0.05 to 0.5 inches. The thickness of each rib structure on the support member is usually the same; however, the thickness may be varied if desired. The rib structure generally has a width which ranges between 0.05 to 0.5 inches. A typical rib structure has dimensions of ⅛ by ⅛ inch.

In accordance with yet another feature of the present invention, the plant support device includes a plurality of hole slots positioned along the length of the support member. The hole slots in the support member can be used for clips, plant ties, fencing wire or other objects that is to be attached to the support member. The hole slots are typically formed by punching holes in the formed support member. The hole slots are typically positioned closely adjacent the rib structures on the support member. If the support member is formed by a molding process, the mold may be designed to form the hole slots or the hole slots can be subsequently punched out. When the hole slots are punched out of the support member, two or more sides of the hole slot are to be cut. If the hole slot is of rectangular shape, typically only two sides are cleanly cut and the other two sides are connected to the material forced into the interior of the support member. The hole slots can be formed into any shape but typically have a square or rectangular shape. The hole slots may also be any size. The size of the opening of the hole slot is generally sized to be only as large as required since a very large hole slot may weaken the strength and stiffness of the support member. Typically, the dimension of a rectangular hole slot is ⅜ by ¾ inch. The hole slots may be positioned on the support member such that two hole slots are diametrically opposed from each other at a certain cross sectional position on the support member and/or staggered along the support member. Typically, the number of hole slots at any cross section point on this support member is not greater than the number of rib structures on the support member. Therefore, the hole slots are positioned on the support member such that no more than one hole slot is adjacent to a rib structure at any cross sectional point on the support member. Support members having hole slots that are positioned diametrically from each other are typically used with plant clips that are attached on both sides of the support member and for barbed wire, electric fencing or other types of fencing wherein the fencing wire is strung through the support member via the hole slots. Although the hole slots may be positioned any where on the support member, the hole slots are typically positioned close or adjacent to the rib structures on the support member. By positioning the hole slots near the rib structures, the loss of strength and stiffness in the support member caused by the hole slots is counteracted by the additional strength and stiffness provided by the rib structure. The hole slots should not be punched through the rib structure since the hole in the rib structure would neutralize any counteracting support supplied by the rib structure. The hole slots are generally positioned directly adjacent to a rib structure since the farther the hole slot is from the rib structure, the less effect the rib structure has on counteracting the effects of the hole slot. The hole slots are typically spaced along the pole any where from 1–12 inches apart, but may be spaced at larger or closer distances apart if desired. Typically, the hole slots are spaced 3–5 inches apart.

In accordance with another aspect of the present invention, there is provided a plurality of serrations or notches on the rib structures. The serrations form a texture on the rib structure to prevent slippage of plant ties which normally occurs on smooth support poles. The plant ties which are generally made of twine, thin wire and cloth tend to slip down on smooth poles resulting in unsatisfactory support of the plant stems. By texturizing the rib structures with serrations, the plant ties are prevented from slippage. The textured rib structures can also be used for supporting plants by the commonly used weave method. The serrations in the rib structure are generally relatively shallow in depth. Typically, serrations have a depth which penetrates less than one-half the thickness of the rib structure. Serrations that penetrate deeper in the rib structure may adversely affect the structural strength and stiffness provided by the rib structure to the support member. Serrations may be formed by cutting notches into the rib structure, rotating a wheel (heated or unheated) or mechanical press (heated or unheated) over the rib structure, by mold forming, or any other method. The serrations may be at any space relation from one another but are typically evenly spaced from one another at a distance ranging between 0.5 to 2 inches apart.

In accordance with a further feature of the present invention, there is provided an extension member which telescopically inserts into the support member to provide additional length to the plant support device. The extension member is generally formed the same way as the support member. If the extension member is made by the extrusion method, the sizing head on the extrusion machine is adjusted to form an extension member with a smaller cross-sectional area than the support member. Whatever process is used to form the extension member (i.e. molding, extrusion, roll forming, etc.) the cross-sectional area of the extension member must be small enough such that the extension member can be inserted into the support member. Generally, the cross-sectional shape of the support member and extension member are the same and usually are circular in shape. The length of the extension member is generally less than or equal to the length of the support member. Generally, the support member is cut in 3 to 4 foot sections. The extension member is usually made of plastic such as polyvinyl chloride; however, it can be made of other materials such as wood, metal or other plastics. The extension member can have a hollow, solid or partially hollow core. The thickness of the walls of the extension member may be any thickness and will depend on the use of the plant stake. Typically, the wall thickness ranges between 0.05 to 0.5 inches. The extension member generally includes at least one rib member extending the longitudinal length of the extension member which may be formed directly with or attached subsequent to the formation of the extension member. The rib member on the extension member not only provides extra strength but also frictionally engages the inner wall of the support member to form a rigid and secure connection between the inserted extension member and the support member. The friction engagement produced by the rib member prevents the extension member from freely rotating inside the support member and prevents the extension member from easily slipping out of or further into the support member. Three to four rib members typically are used on the extension member to provide additional strength and stiffness. The extension member may also contain a plurality of hole slots. The hole slots are usually positioned close or adjacent to the rib members. The hole slots can be staggered along the pole and/or diametrically positioned apart from one another. The hole slots are normally positioned 1 to 12 inches apart from one another along the length of the extension member. The method of producing the hole slots on the extension member are similar to the method for producing the hole slots on the support member. The rib member on the extension member also may include a plurality of serrations to prevent slippage of plant ties that are used to secure the plant stems. The positioning and method of producing the serrations are similar to the positioning and method of forming the serrations on the support member. A cap member sized for the extension member may be inserted into the end of the extension member to prevent dirt and/or liquids from entering the plant support device.

In accordance with a still further feature of the present invention, the support member contains a plurality of frictional protrusions on the interior wall surface of the support member which frictionally engage the exterior walls of the extension member that is inserted into the support member. The frictional protrusions create a highly frictional surface between the extension member and the support member. This frictional interaction prevents the extension member from collapsing into the support member when the extension member is supporting heavy loads. The frictional protrusions also prevent the extension member from rotating within the support member since the rib members and/or the outer surface of the extension member cannot easily rotate about the frictional protrusions. The frictional protrusions can have any shape, thickness, length or width. The frictional protrusions are designed to be large enough to prevent the extension member from rotating and from easily collapsing into the support member when supporting plant stems and/or fencing yet small enough to allow the extension support member to be inserted into the support member and to later disengage the extension member for easy storage. The frictional protrusions may be formed during the extrusion process by using an extrusion head that forms an inner protrusion similar to the rib structure on the exterior of the support member, by a molding process, and/or by inserting material inside the support member from the punching out of hole slots in the support member.

In accordance with another feature of the present invention, a resilient plant clip is inserted on the plant support device to secure plant stems to the plant support member. The plant clip can be constructed of any suitable material such as plastic or metal and can be formed in a variety of shapes, sizes, thicknesses and widths to suit the particular plant to be supported. Plastic materials are usually used for the plant clip due to its strength and ease of making. Polypropylene is normally used due to its strength and flexibility. Polypropylene plant clips securely hold plant stems and fencing yet bend enough so that the plant clip will not break when being inserted or removed. Polypropylene also will slightly bend if the plant stems grow too thick thus avoiding strangulation of the plant. The plant clips are typically formed from a mold, but can be punched out of plastic sheets, extruded, etc. The plant clip includes a first leg having at least one securing tab protruding therefrom. The securing tabs can be any length, shape or size. Generally the securing tab is rectangular or square shaped and extends less than one inch out from the first leg. The cross-sectional dimensions of the securing tab are less than or equal to $\frac{3}{8}$ by $\frac{3}{4}$ inch. Typically, the dimensions of the securing tab are such that the tab securely fits into a hole slot on the support member or extension member. A polygonal cross sectional design of the securing tab is normally used to prevent the tab from rotating within the hole slot, thus securing the plant clip to a position relative to the support member or extension member. The securing tab may be at any angular relationship to the first leg. Generally, the securing tab extends perpendicular or near perpendicular from the first leg for easy insertion and removal from the hole slot; and rarely is less than 30° relative to the first leg. The securing tab may also have a small notch with a width at least equal to the width of the wall of the support member or extension member. The depth of the notch may vary depending on the size of the securing tab, but is typically less than half the depth of the securing tab. The notch is typically positioned near the first leg such that the securing tab is completely inserted into the hole slot then moved forward such that the notch engages the wall of the support member or extension member. The notch once engaged prevents the securing tab from slipping out of the hole slot and rotating within the hole slot. The first leg of the plant clip is connected to an intermediate portion which is in turn connected to a second leg. The intermediate portion may be any shape or size. The intermediate portion may contain two or more sub-sections in some angular relationship to each other. Generally, the intermediate portion has two subsections joined together in the shape of a "V" which forms an angle which is less than 175° and generally between 90° to 150°. The V-shaped design of the intermediate portion reduces plant stem movement within the clip since the plant stems settle into the junction between the two subsections. A V-shaped design is superior to a curved or flat intermediate portion since a V-shaped design will prevent the plant stem from freely moving about the intermediate portion thus reducing damage to the plant stem. V-shaped connections between the intermediate portion and the first leg and/or the second leg may also be formed to further secure the plant stem. The second leg of the plant clip may or may not include a securing tab. If the second leg includes a securing tab, the securing tab is inserted into a hole slot in the support member or extension member which is typically diametrically or essentially diametrically positioned from the hole slot of the securing tab of the first leg. The design, dimensions and positioning of the securing tab on the second leg are typically the same as the securing tab on the first leg. The securing tab on the second leg may also have a notch. The use of a securing tab on both the first and second leg of the plant clip increases the strength of the connection between the plant clip and the support member or extension member. Plant clips with a securing tab on both legs are desirable when supporting large or heavy plant stems or fencing. The cross-section shape of the first leg, intermediate portion and second leg can be any shape, but generally is a polygonal shape (i.e. square, rectangular). If the cross-section shape is rectangular, the dimensions are usually not greater than $\frac{3}{8}$ by $\frac{3}{8}$ inch; however, larger dimensions may be used for plant clips carrying very heavy loads. The length of the first leg and second leg of the plant clip will vary depending on the size of the plant clip and the size of the support member or extension member. The length of the two legs must be long enough to produce a large enough space between the intermediate portion and the support member or extension member for the plant stems. If the plant clip is used to support fencing the spacing between the intermediate portion and the support member or extension member can be relatively small. Typically, the length of each leg ranges between 1 to 4 inches. The length of the first leg may be longer, shorter or the same as the length of the second leg. Generally, the second leg is longer than the first leg if the second leg does not have a securing tab. When both legs have securing tabs, the length of both legs is generally the same. The plant clips are designed such that the spacing between the first leg and second leg at the point where both legs contact the support member or extension member is not greater than the width of the support member or extension member. This space relation between the two legs results in pressure exerted on the support member by the two legs. The pressure exerted by the two plant clip legs maintains the plant clip in position relative to the support member or extension member. The pressure also prevents the securing tabs within the hole slots from easily disengaging from the support member or extension member. However, the pressure exerted by the both legs must not be too large so as to result in difficult insertion or removal of the plant clips from the support members or extension members. Plant clips that are to be used for fencing may include a clasp member. The clasp member is generally located on the intermediate portion. The clasp member allows the fencing to be easily secured to the support member or extension member without having to twist the fencing through the plant clip or insert the wire through the hole slots. This clasp member is typically C-shaped with a small opening to allow the wire fencing to be securely inserted. The clasp member can be formed separately or with the plant clip. The clasp member can be made of the same or some different material than the plant clip. Generally the clasp member is made with the plant clip and with the same material as the plant clip.

The principal object of the present invention is to provide an improved plant support device and system for securing a plant stem and/or fencing to the plant support device.

Another object of the present invention is to provide an improved plant support device having at least one rib structure to provide additional structural support to the support member.

Yet another object of the present invention is to provide an improved plant support device wherein the rib structure on the plant support member has a plurality of serrations to prevent slippage of plant ties which are used to connect the plant stem to the plant support device.

Another object of the present invention is to provide an end member which rigidly attaches to the support member and provides for easy insertion of the plant support device into the ground.

Still yet another object of the present invention is to provide a cap member which rigidly inserts on the support member or extension member and prevents damage to the plant support device during insertion into the ground and also prevents dirt and water from entering the inside of the plant support device.

A further object of the present invention is to provide a extension member which can be telescopically inserted into the support member to increase the length of the plant support device.

Still a further object of the present invention is to provide a support member having protrusions on the interior wall to frictionally engage the extension member and prevent the extension member from easily rotating or moving within the support member.

Yet still a further object of the present invention is to provide a resilient plant clip which may be attached to one or both sides of the plant support device to easily attach the plant stem to the plant support device.

Another object of the present invention is to provide a plant clip with a clasp member which secures fencing to the plant support device.

These and other objects and advantages will become apparent from the following description used to illustrated the preferred embodiment of the invention when read in conjunction with the accompanying drawings.

PREFERRED EMBODIMENT OF THE INVENTION

Figure 1:
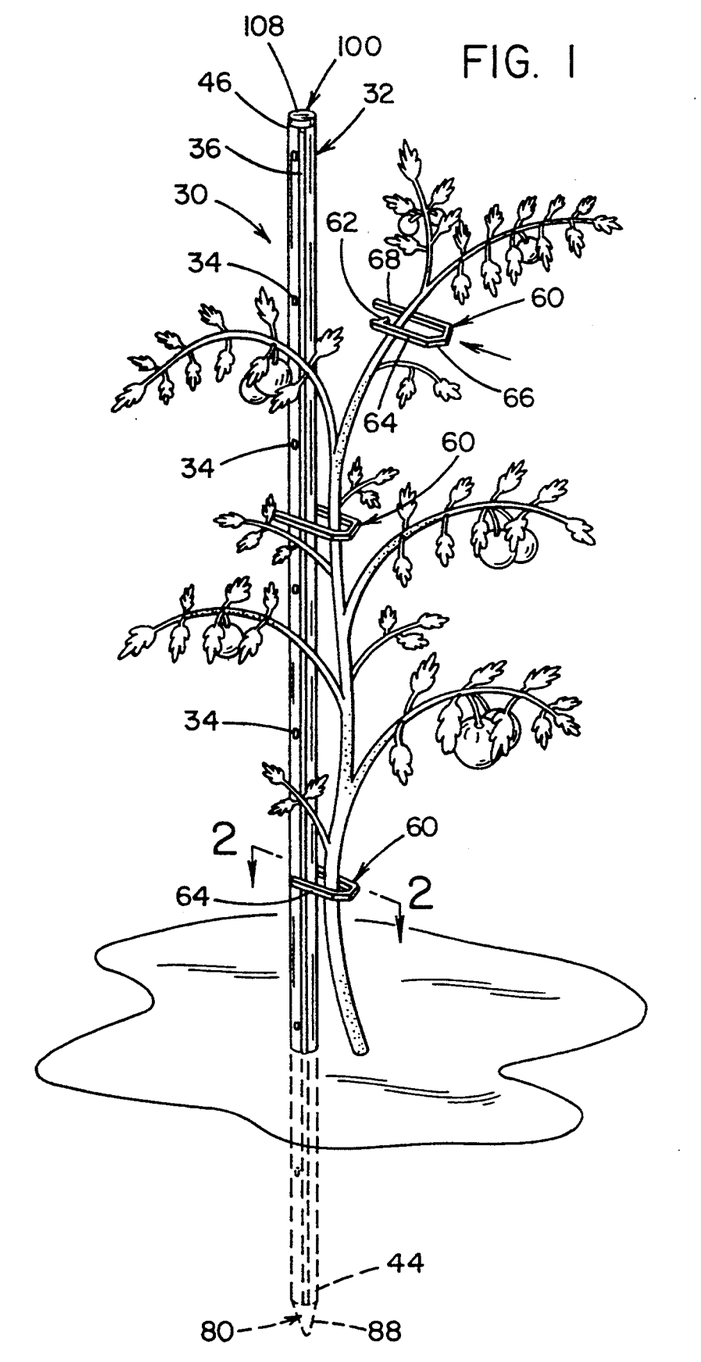
FIG. 1 illustrates a view of a plant support device having a plurality of plant clips inserted adjacent to and supporting a plant.
Figures 2, 3:
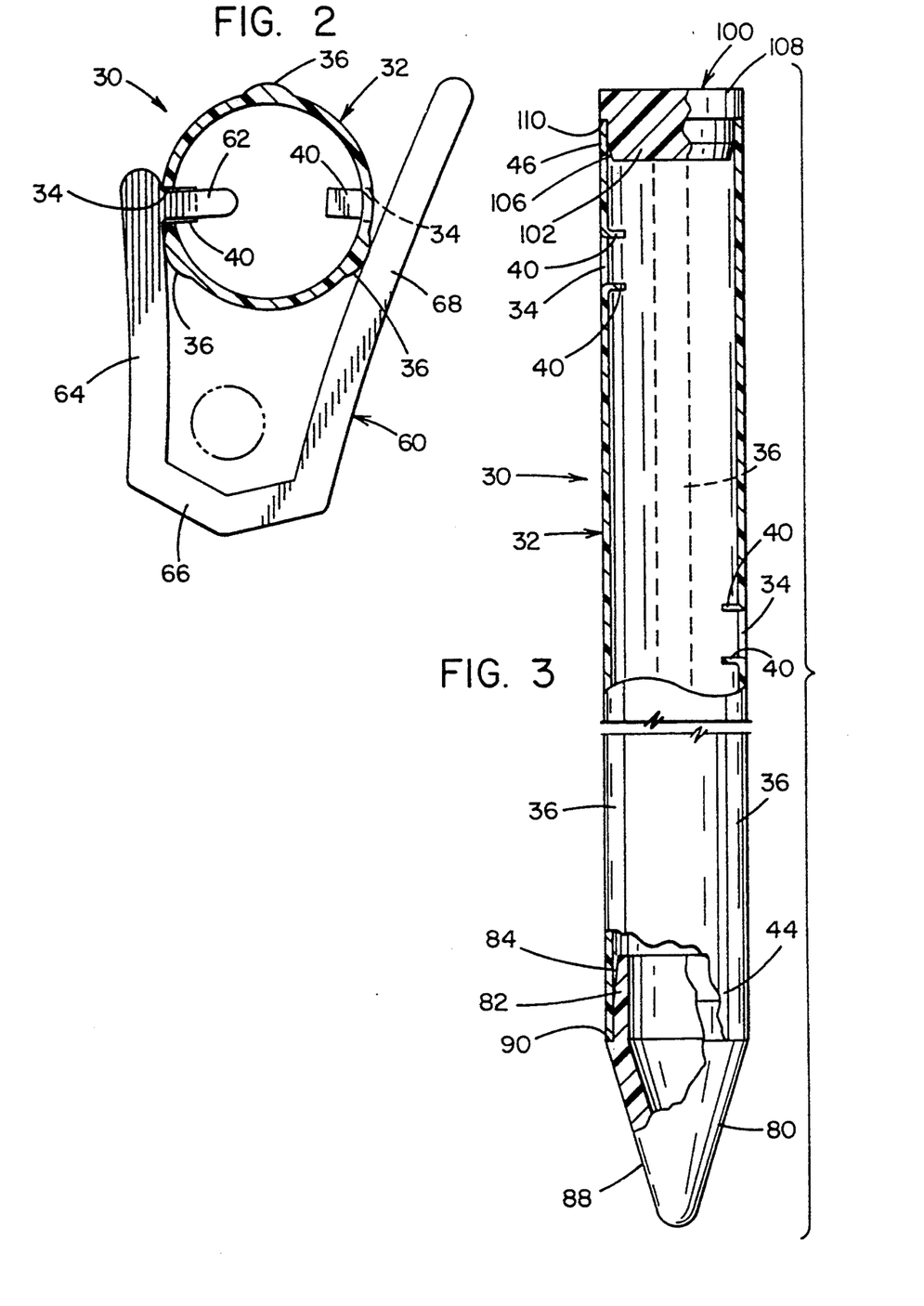
FIG. 2 illustrates a plant clip attached to a ribbed plant support device.
FIG. 3 is a sectional view of the side of a support member having a plurality of rib structures and hole slots and having an end member and a cap member.
Figures 4, 5, 6:
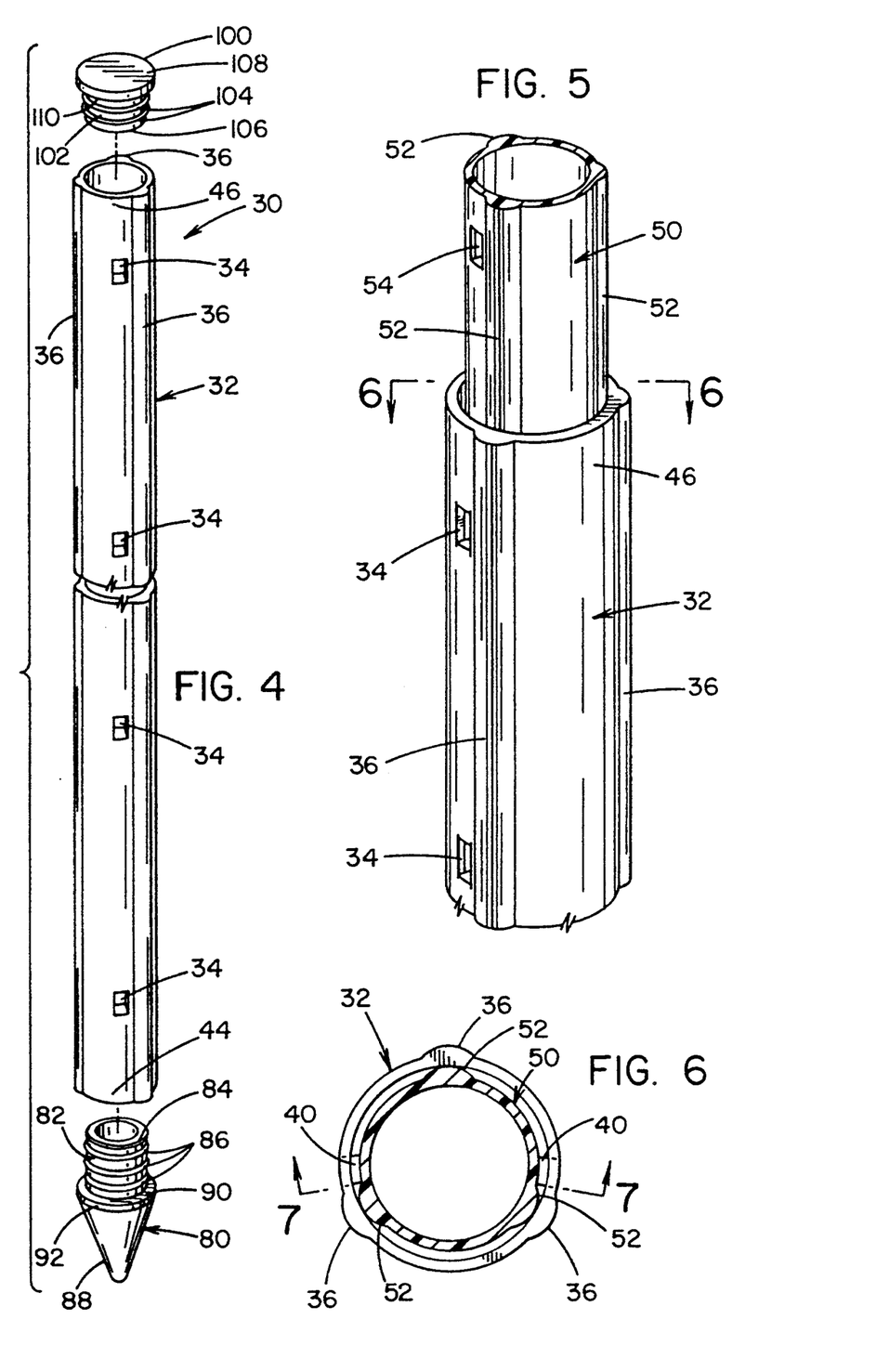
FIG. 4 is a is a complete side view of a support member as shown in FIG. 3.
FIG. 5 illustrates an extension member inserted into a support member.
FIG. 6 is a cross-sectional view taken on line 6—6 of FIG. 5.
Figure 9:
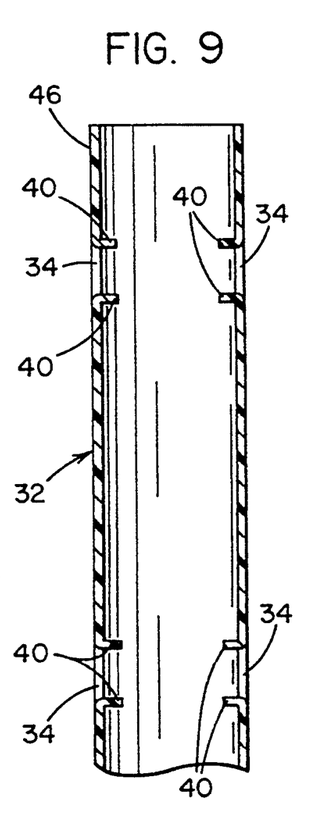
FIG. 9 illustrates a sectional side view of a support member having a plurality of hole slots and frictional protrusions.
Figure 10:
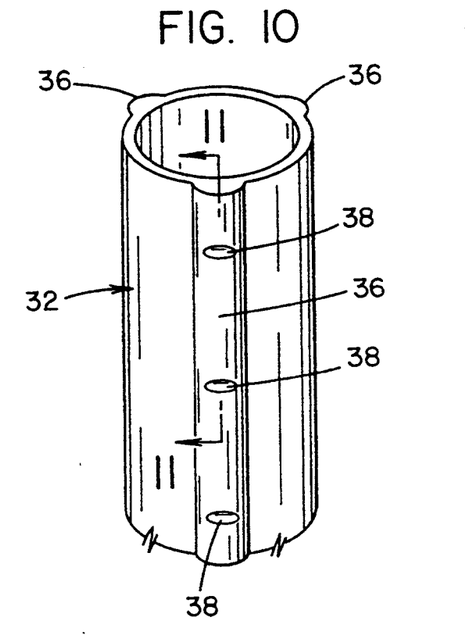
FIG. 10 illustrates a rib structure on the plant support device having a plurality of serrations.
Figure 11:
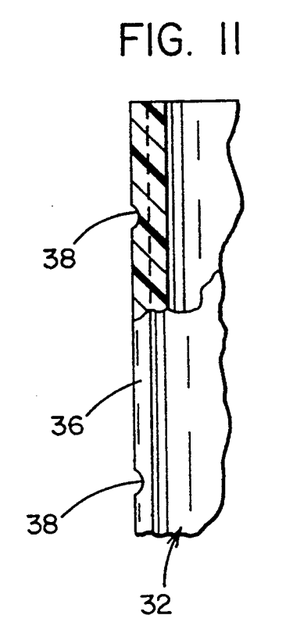
FIG. 11 is an enlarged side view partially in section taken on line 11—11 of FIG. 10 showing the serrated rib structure.

Referring now to the preferred embodiment of the invention only and not for the purpose of limiting the same, FIG. 1 illustrates a plant support device 30 in accordance with the present invention. Plant support device 30 is made up of a support member 32. Support member 32 is preferably an extruded hollow tube made of polyvinyl chloride. Support member 32 has a distal end 44 and a proximal end 46. Distal end 44 is inserted into the ground adjacent to a plant 20. 10 Support member 32 is about four to six feet in length and having an inner diameter between 0.8 to 2 inches and a wall thickness between 0.05 to 0.2 inch. Support member 32 has at least one rib structure 36 extending along the longitudinal length of support member 32 as illustrated in FIG. 4. Preferably support member 32 has three or four rib structures 36 each have ⅛ by ⅛ inch dimensions. Rib structures 36 are spaced equally apart to provide the maximum structural support and stiffness to support member 32. Rib structure 36 has a plurality of serrations 38 as shown in FIGS. 10 and 11. Each serration is spaced about 1" apart. Serrations 38 are formed by rotating a heated wheel over rib structure 38. The depth of serration 38 is not more than 1/16 inch. As illustrated in FIGS. 2, 3 and 4, support member 32 has a plurality of hole slots 34. Hole slots 34 are preferably positioned four to five inches apart along the longitudinal length of support member 32 and adjacent to a rib structures 36. Preferably, hole slots 34 are rectangular in shape and have dimensions not exceeding ⅜ by ⅜ inch and are punched out on two sides after support member 32 is formed by an extrusion process. Hole slots 34 may be paired such that two hole slots are diametrically opposed from each other as illustrated in FIG. 9.

Support member 32 includes an end member 80 that is attached to distal end 44 of support member 32 as illustrated in FIGS. 3 and 4. End member 80 includes a one inch shaft portion 82 which is inserted into distal end 44. Shaft portion 82 has a beveled end 84 for easy insertion into distal end 44. Shaft portion 82 also includes three compression rings 86 equally spaced apart to secure end member 80 to distal end 44. End member 80 also has a conically shaped angular portion 88 attached to shaft portion 82. Angular portion 88 forms a lip 90 with shaft portion 82. Lip 90 has a width equal to the wall thickness of support member 32. Angular member 88 has a squared off base 92 forming a flush surface with the exterior surface of support member 32. End member 80 is formed from a mold and is made from polypropylene.

Support member 32 has a cap or anvil member 100 inserted into proximal end 46 to prevent water and dirt from entering the tubular support member 32 as illustrated in FIGS. 3 and 4. Cap member 100 also prevents damage to proximal end 46 during insertion for support member 32 into the ground. Cap member 100 is a mold piece of polypropylene and includes a trunk portion 102. Trunk portion 102 is cylindrically shaped and is inserted into proximal end 46. Trunk portion 102 has two equally spaced compression rings 104 which rigidly secure cap member 100 to support member 32. Trunk portion 100 has a beveled corner 106 to facilitate easy insertion of trunk portion 102 into proximal end 46. Cap member 100 has a cylindrically shaped top portion 108 connected to trunk portion 102. Top portion 108 has a diameter equal to the outer diameter of support member 32 and forms a lip 110 with trunk portion 102 having a width equal to the wall thickness of support member 32. Top portion 108 is solid plastic and has a thickness of ¼ inch. Cap member 100 consists of polypropylene and is formed from a mold.

Figure 7:
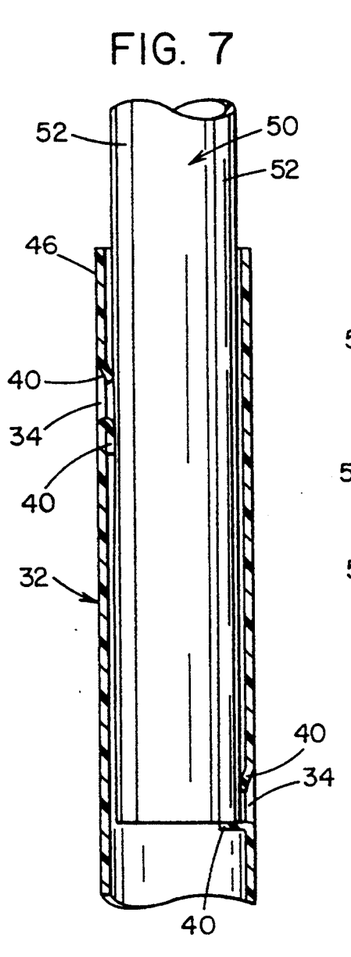
FIG. 7 is a sectional view taken on line 7—7 of FIG. 6 illustrating frictional protrusions of the support member in association with the inserted extension member.
Figure 8:
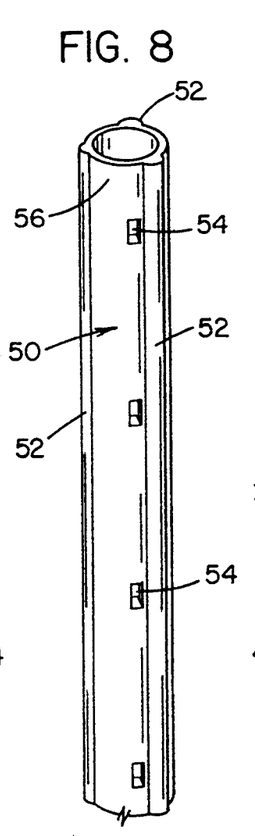
FIG. 8 illustrates an extension member having a plurality of hole slots and rib structures.

Plant support device 30 can be lengthened by telescopically inserting extension member 50 into proximal end 46 of support member 32, as shown in FIGS. 5, 6 AND 7. Extension member 50 is an extruded polyvinyl chloride tube about 4 feet in length and has an outer diameter which is slightly smaller than the inner diameter of support member 32 and a wall thickness between 0.05 to 0.2 inches. Extension member 50 has three rib members 52 equally spaced apart and transversing the entire longitudinal length of extension member 50. Each rib member 52 is about ⅛ inch thick and ⅛ inch in width.

As shown in FIGS. 6 and 7, rib members 52 contact the inner wall of support member 32 to form a frictional contact which prevents extension member 50 from rotating in or slipping into and out of support member 32 while supporting plants. Extension member 50 contains a plurality of rectangular shaped hole slots 54 which are punched out after extension member 50 is formed. Hole slots 54 are positioned adjacent to rib member 52 and are spaced 4 to 5 inches apart.

Support member 32 has frictional protrusions 40 on the inner wall to prevent extension member 50 from moving inside support member 32. Frictional protrusions 40, as illustrated in FIGS. 7 and 9 are formed by punching two sides of the wall of support member 32 in forming hole slots 34 and bending the other two sides of the wall into the inner of support member 32. When extension member 50 is inserted into support member 32, the exterior wall and rib members 52 of extension member 50 frictionally engage frictional protrusions 40. When extension member 50 is inserted into support member 32, cap member 100 is inserted into proximal end 56 of extension member 50 instead of proximal end 46 of support member 32.

Figure 16:
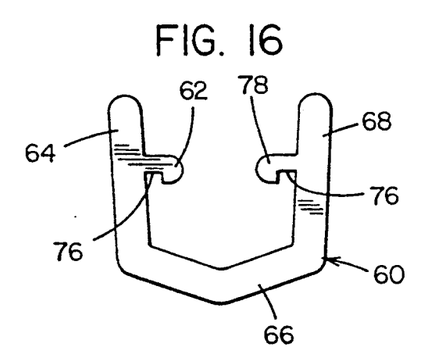
FIG. 16 illustrates a plant clip having notches on the securing tabs.
Figure 17:
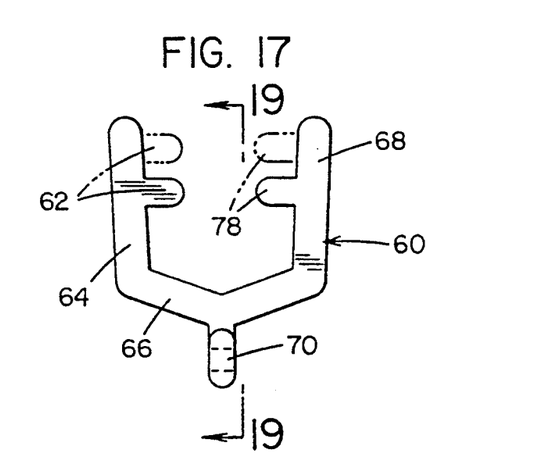
FIGS. 17 and 18 illustrate plant clips having a clasp member.
Figure 18:
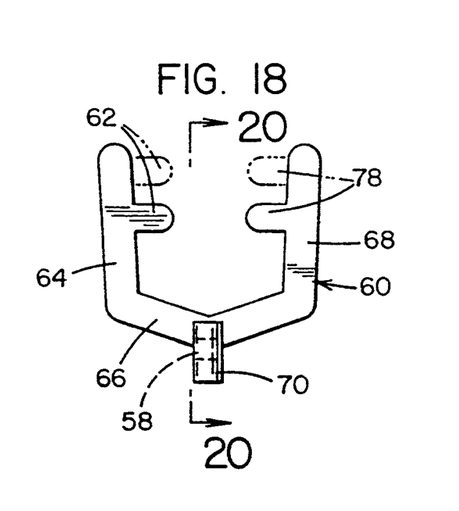
Figure 19:
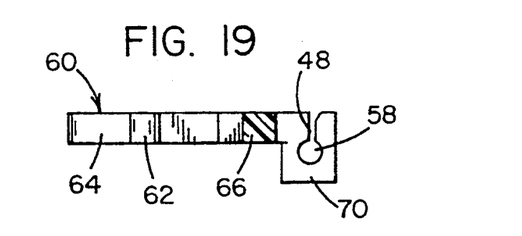
FIGS. 19 and 20 are cross sectional views of plant clips illustrated in FIGS. 17 and 18.
Figure 20:
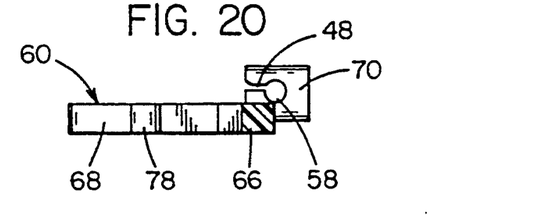

Plant support device 30 may include plastic plant clips 60 made of molded polypropylene. As illustrated in FIGS. 12–18, a variety of different plant clips 60 can be used with support member 32. Each plant clip 60 has a securing tab 62 attached to the first leg 64 of plant clip 60. Securing tab 62 has a rectangular cross sectional shape and is about ½ inch long. The rectangular cross section shape of securing tab 62, upon insertion into support member hole slot 34 or extension member hole slot 54, prevents securing tab 62 from rotating thus maintaining the portion for plant clip 62 relative to support member 32 or extension member 50. This angular orientation of securing tab 62 relative to first leg 64 can vary, as illustrated in FIGS. 12–15. However, the angle 74 is preferably greater than 60° so that plant clip 60 can be easily inserted and removed. FIG. 16 illustrates a modified securing tab 62 having a notch 76. Notch 76 has depth less than half the depth of securing tab 62 and a width equal to the width of the wall thickness of support member 32 or extension member 50. Notch 76 fits about the wall of support member 32 and extension member 50 therefore preventing securing tab 62 from rotating about and slipping out of hole slot 34 or hole slot 54.

Figure 12:
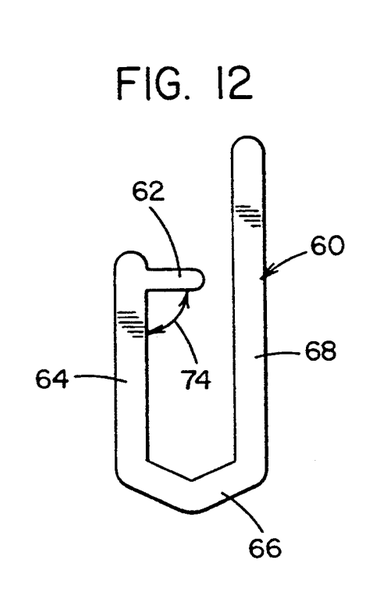
FIGS. 12-15 illustrate various types of plant clips.
Figure 13:
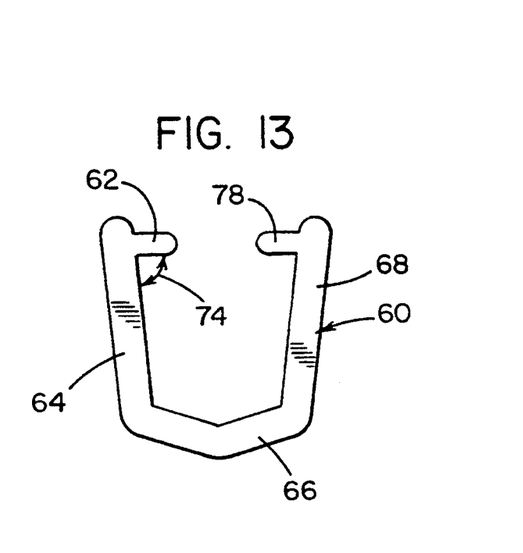
Figure 14:
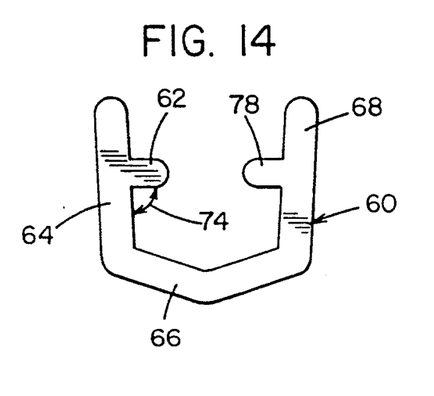
Figure 15:
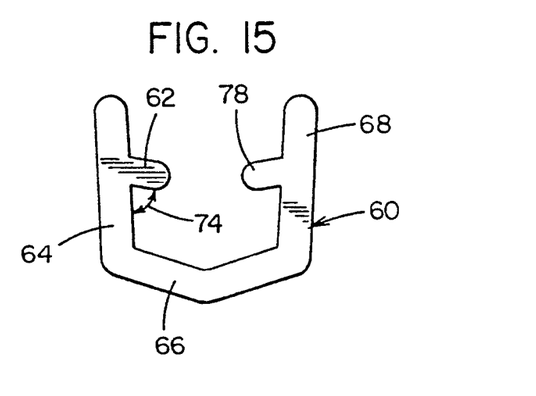

Plant clip 60 includes an intermediate portion 66 having two linear shaped subcomponents. First leg 64 is connected to one end of intermediate portion 66 and a second leg 68 of plant clip 60 is attached to the other end of intermediate portion 66. The two linear subcomponents of intermediate portion 66 are angularly situated to form a V-shaped intermediate portion 66. The angle formed by the two subcomponents is preferably between 90°–130°. V-shaped connections are also formed between first leg 64—intermediate portion 66 and second leg 68—intermediate portion 66. The V-shaped angle formed between the legs and intermediate portion 66 is greater than 90° and less than 175°. The spacing between first leg 64 and second leg 68 is slightly less than the outer diameter of support member 32 or extension member 50, resulting in each leg applying pressure to the sides of support member 32 or extension member 50 as illustrated in FIG. 2. The pressure exerted by first leg 64 and second leg 68 prevents securing tab 62 from slipping out of hole slot 34 or hole slot 54 and prevents plant clip 60 from moving relative to support member 32 or extension member 50 after being inserted on plant support device 10. Second leg 68 may or may not have a securing tab 78. As shown in FIGURES 2 and 12, second leg 68 is longer than first leg 64 if second leg 68 does not have a securing tab 78 to prevent plant clip 60 from slipping off. Plant clip 66 which does not have securing tab 78 on second leg 68 is designed such that second leg 68 contacts rib structure 36 or rib member 52 to facilitate in easy removal and insertion of plant stems. Plant clip 60 which has securing tab 78 on second leg 68 is designed such that first leg 64 and second leg 68 are the same length, as shown in FIGS. 13–16. Securing tab 78 on second leg 68 has the same dimensions and angular positioning as securing tab 62 on first leg 64.

FIGS. 17–20 illustrate a modification to plant clip 60 wherein a clasp member 70 is formed on intermediate portion 66. Clasp member 70 has a C-shape portion 58 and a slot portion 48. Clasp member 70 is designed to support fencing by inserting the fencing through slot portion 48 and into C-shaped portion 58. Slot portion 48 has a width which is less than the diameter of the fencing wire to prevent the fencing from disengaging from clasp member 70. The positioning of clasp member 70 relative to intermediate portion 66 can vary depending on the angle of engagement desired between plant clip 70 and the fencing.

Although the invention has been described with reference to specific embodiments, variations within the scope of the following claims will be apparent to those skilled in the art.

Having thus described the invention, it is claimed:

1. A plant support device for primarily supporting plant stems and fencing comprising:
   a support member having a distal end and a proximal end, at least one rib structure on the exterior surface of said support member and extending longitudinally between said distal end and said proximal end, and at lest one hole slot positioned between said distal end and said proximal end;
   an extension member telescopically inserted into said support member to extend the length of said plant support device, said extension member and a plurality of hole slots; and
   securing means for rigidly affixing said extension member to said support member, said securing means including at least one frictional protrusion in the inner surface of said support member to form a rigid connection with the outer surface of said extension member.

2. A plant support device as defined in claim 1, wherein said rib structure has a plurality of serrations.

3. A plant support device as defined in claim 2, wherein said support member has three to five of said rib structures.

4. A plant support device as defined in claim 3, wherein said rib structures are equally spaced apart.

5. A plant support device as defined in claim 3, wherein said at least two hole slots are diametrically positioned on said support member.

6. A plant support device as defined in claim 5, including an end member insertable on said distal end of said support member, said end member having a shaft portion and an angular portion, said angular portion protruding out from said distal end to facilitate insertion of said distal end into said ground, said shaft portion including means for rigidly engaging said distal end of said support member.

7. A plant support device as defined in claim 6, including a cap member insertable on said proximal end of said support member, said cap member having a trunk portion and means associated with said trunk portion for rigidly engaging said proximal end of said support member.

8. A plant support device as defined in claim 6, including an extension member to extend the length of said plant support device, said extension member telescopically inserted into said support member, said extension member including at least one rib structure and a plurality of hole slots, said at least one rib structure extending the length of said extension member.

9. A plant support device as defined in claim 1, wherein said support member has three to five of said rib structures.

10. A plant support device as defined in claim 1, wherein said at least two hole slots are diametrically positioned on said support member.

11. A plant support device as defined in claim 1, including an end member insertable on said distal end of said support member, said end member having a shaft portion and an angular portion, said angular portion protruding out from said distal end to facilitate insertion of said distal end into said ground, said shaft portion including means for rigidly engaging said distal end of said support member.

12. A plant support device as defined in claim 1, including a cap member insertable on said proximal end of said support member, said cap member having a trunk portion and means associated with said trunk portion for rigidly engaging said proximal end of said support member.

13. A plant support device as defined in claim 1, including an extension member to extend the length of said plant support device, said extension member telescopically inserted into said support member, said extension member including at least one rib structure and a plurality of hole slots, said at least one rib structure extending the length of said extension member.

14. A plant support device as defined in claim 13, wherein said rib structure on said extension member has a plurality of serrations.

15. A plant support device as defined in claim 13, including a cap member insertable on the end of said extension member, said cap member having a trunk portion and means associated with said trunk portion for rigidly engaging said extension member.

16. A plant support device as defined in claim 1, where said support member includes at least two of said hole slots positioned adjacent to each at least one rib structure.

17. A plant support device as defined in claim 16, wherein said rib structure has a plurality of serrations.

18. A plant support device for primarily supporting plant stems and fencing comprising:
   a support member having a distal end and a proximal end, at least one rib structure on the exterior surface of said support member and extending longitudinally between said distal end and said proximal end, and at lest one hole slot positioned between said distal end and said proximal end, and an end member insertable on said distal end, said end member including a shaft portion and an angular portion, said angular portion protruding out from said distal end to facilitate insertion of said distal end into said ground, said shaft portion including means for rigidly engaging said distal end of said support member;

an extension member telescopically inserted into said support member to extend the length of said plant support device, said extension member including at least one rib structure extending the length of said extension member and a plurality of hole slots; and securing means for rigidly affixing said extension member to said support member, said securing means including at least one protrusion in the inner surface of said support member to form a rigid connection with the outer surface of said extension member.

19. A plant support device as defined in claim 18, wherein said rib structure on said extension member has a plurality of serrations.

20. A plant support device as defined in claim 19, including a cap member insertable on the end of said extension member, said cap member having a trunk portion and means associated with said trunk portion for rigidly engaging said extension member.

21. A plant support device as defined in claim 20, including a resilient plant clip comprising: a first leg positioned adjacent to one of said hole slots, said first leg including at least one securing tab on said first leg portion, said securing tab inserted into said hole slot to rigidly secure said first leg to a fixed position relative to said plant support device;

a flexible intermediate portion having a first end and a second end and extending partially about the outer perimeter of said plant support device, said first end connected to said first leg portion;

a second leg connected to said second end of said intermediate portion, said second leg extending at least to the side of said plant support device diametrically opposed to said first leg securing tab, said first leg and said second leg having a space relation such that said legs apply pressure to both sides of said plant support device.

22. A plant support device as defined in claim 21, including at least one securing tab on said second leg, said securing tab positioned into one of said hole slots positioned generally diametrically opposed to said hole slot for said securing tab of said first leg portion.

23. A plant support device as defined in claim 22, wherein said securing tab on said first leg and said second leg of aid plant clip includes a notch whereby fastening said securing tabs to said plant support device.

24. A plant support device as defined in claim 22, wherein said intermediate portion includes a clasp means for securing fencing wire to said plant support device.

25. A plant support device as defined in claim 24, wherein said securing tab on said first leg and said second leg of said plant clip includes a notch whereby fastening said securing tabs to said plant support device.

26. A plant support device for primarily supporting plant stems and fencing comprising:

a support member having a distal end and a proximal end, at least one rib structure on the exterior surface of said support member and extending longitudinally between said distal end and said proximal end, and at least one hole slot positioned between said distal end and said proximal end; and a resilient plant clip including a first leg positioned adjacent to one of said hole slots, said first leg including at least one securing tab, said securing tab inserted into said hole slot to rigidly secure said first leg to a fixed position relative to said plant support device, a flexible intermediate portion having a first end and a second end and extending partially about the outer perimeter of said plant support device, said first end connected to said first leg portion, a second leg connected to said second end of said intermediate portion, said second leg extending at least to the side of said plant support device diametrically opposed to said first leg securing tab, said first leg and said second leg having a space relation such that said legs apply pressure to both sides of said plant support device.

27. A plant support device as defined in claim 26, including at least one securing tab on said second leg, said securing tab positioned into one of said hole slots positioned generally diametrically opposed to said hole slot for said securing tab of said first leg portion.

28. A plant support device as defined in claim 26, wherein said intermediate portion of said plant clip includes a clasp means for securing fencing wire to said plant support device.

29. A plant support device as defined in claim 26, wherein said securing tab on said first leg of said plant clip includes a notch whereby fastening said securing tab to said plant support device.

30. A resilient plant support clip member formed from plastic comprising a first leg having at least one securing tab which includes a notch for fastening said securing tab, a flexible intermediate portion having a first end and a second end, said first end connected to said first leg and said second end connected to a second leg of said plant clip, said second leg extending at least to a point diametrically opposed to said first leg securing tab and having a predetermined spaced relationship from said first leg.

31. A resilient plant clip as defined in claim 30, wherein said second leg includes at least one securing tab.

32. A resilient plant clip as defined in claim 31, wherein said securing tab on said second leg includes a notch.

33. A resilient plant clip as defined in claim 30, wherein said intermediate portion includes clasp means for securing fencing wire.

34. A resilient plant clip as defined in claim 30, wherein said intermediate portion includes at least two linear sub-components, said linear sub-components having a total angular relationship of less than 180°.

35. A resilient plant clip as defined in claim 34, wherein said at least two linear sub-components form a generally semi-circular intermediate portion.

* * * * *